Figure 1:
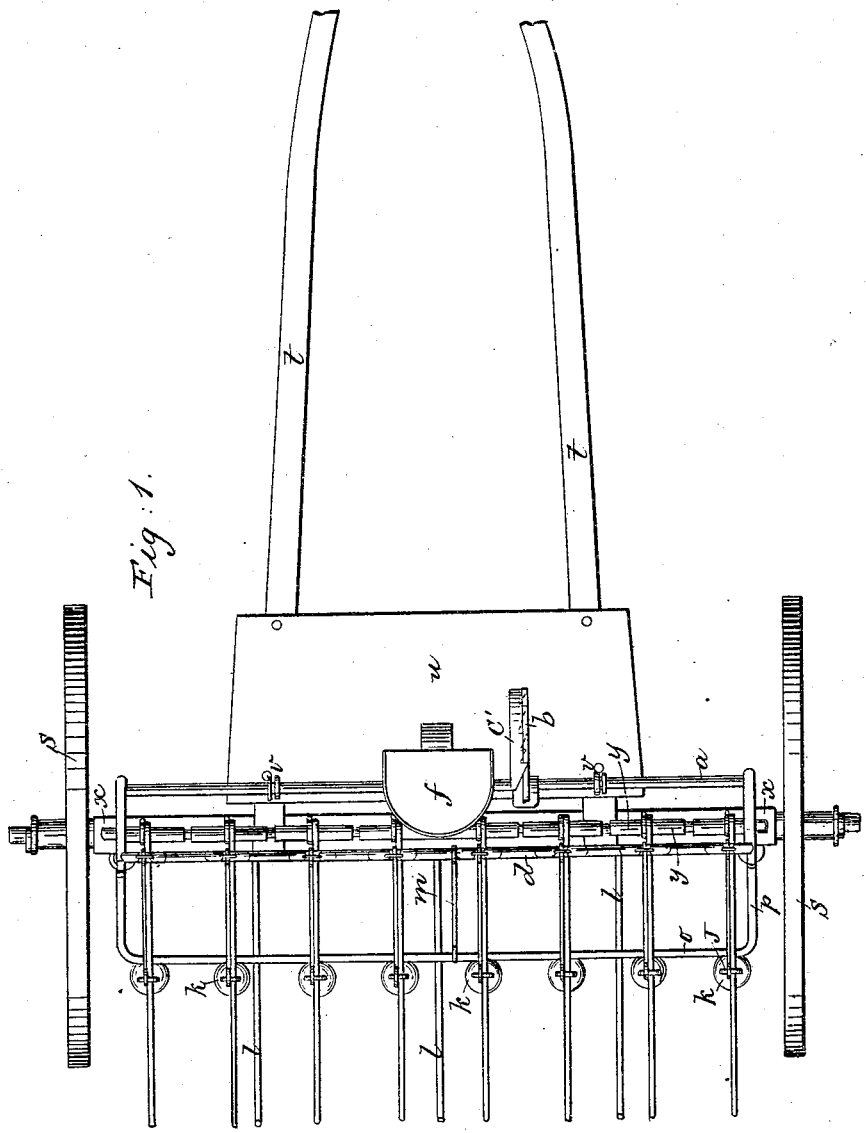

A. R. HURST.
Horse Rake.

No. 29,082.

2 Sheets—Sheet 1.

Patented July 10, 1860.

Witnesses

Inventor

A. R. HURST.
Horse Rake.
No. 29,082.
2 Sheets—Sheet 2.
Patented July 10, 1860.
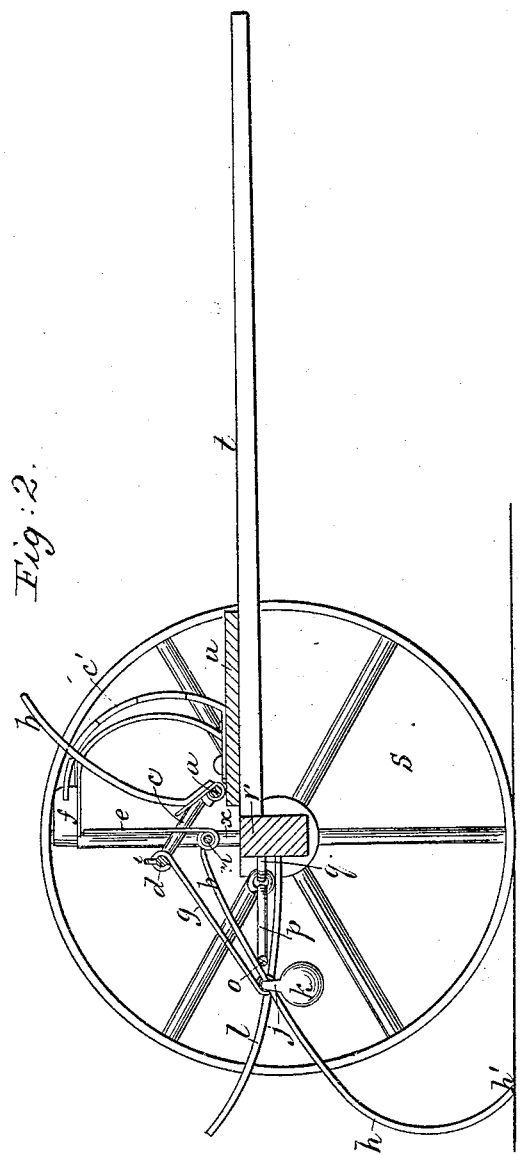

UNITED STATES PATENT OFFICE.

A. R. HURST, OF CHAMBERSBURG, PENNSYLVANIA.

IMPROVEMENT IN HORSE HAY-RAKES.

Specification forming part of Letters Patent No. 29,082, dated July 10, 1860.

*To all whom it may concern:*

Be it known that I, A. R. HURST, of Chambersburg, in the county of Franklin and State of Pennsylvania, have invented a new and useful Improvement in Horse Hay-Rakes; and I do hereby declare that the following is a full, clear, and exact description of the same, reference being had to the accompanying drawings, forming a part of this specification, in which—

Figure 1 represents a plan, and Fig. 2 a vertical section through the machine.

Similar letters of reference in each of the several figures indicate corresponding parts.

The nature of my invention consists, first, in providing each of the rake-teeth (working independently of each other) with an adjustable weight; second, in combining two bearers with a lever and ratchet-bar for the purpose of operating the rake-teeth; third, in making the weights adjustable by hinging them to one of the bearers; fourth, in constructing the devices for regulating the weight upon each rake-tooth and for elevating the rake-teeth above the ground so that one lever serves both purposes.

To enable others skilled in the art to make and use my invention, I will proceed to describe its construction and operation.

The raking apparatus is attached to the beam $r$, which is provided with a pivot at each end for the driving-wheel $s$ to revolve upon. The rod $n$, which serves as a center of motion for the rake-teeth $h$, is fastened to the beam $r$ by means of two vertical arms, $x\ x$. The rod $n$ passes through a series of short tubes, $y$, to each of which a rake-tooth, $h\ e$, is attached, so that each rake-tooth may have free play around the center rod, $n$. One end of each of the rake-teeth $e$ is upright, while the other end, $h$, is bent suitable for gathering the hay or grain, and rests upon the ground at $h'$. The end $e$ is provided so that each tooth may be elevated separately, as occasion may require.

A bearer, $o$, is hung to the beam $r$ at $q\ q$ by means of two arms, $p$, while another lever, $d$, is fastened to a center rod, $a$, by means of similar arms, $c\ c$. The center rod has its bearings upon the platform $u$ at $v\ v$. The two bearers are connected by a link, $m$. An adjusting-lever, $b$, taking into the notches of the ratchet-arc $c'$, and to be worked by the driver, extends from the center rod, $a$, to near the driver's seat $f$. As the bearer $o$ is arranged underneath the rake-teeth $h$ and the bearer $d$ in rear of their upright portions $e$, it will be understood that on depressing lever $b$ the bearers $p$, turning upon center $q\ q$, will bear against the under surface of the teeth $h$, while the bearer $d$, turning upon center $a$, will come to bear against the rear surface of the uprights $e$. A double support in lifting the rake is thus furnished. By this arrangement the rake-teeth are pulled upon at two points, and are lifted with greater ease, as the vertical ends act as levers in lifting the rake.

A weight, $k$, is hung with a ring, $j$, upon each of the rake-teeth, so that each weight may be moved freely backward and forward upon the tooth by means of operating the lever $b$, each weight being linked to the bearer $d$ by a connecting rod or link, $g$. It will be seen that upon raising the lever $b$ the bearer $d$ is thrown backward and the weights are moved backward, and in consequence of increasing their distance from the center of motion $n$ of the rake-teeth the weight bearing upon the bottom end, $h'$, of each of the rake-teeth is increased in a corresponding ratio. Upon depressing the lever $b$ the bearer $d$ is drawn forward, and with it the weights $k$ move forward. By thus diminishing the distance between the weights and the center of motion $n$ of the rake-teeth the weights are made to bear with less force upon the bottom ends, $h'$, of the rake-teeth. Thus it will be seen the pressure upon the bottom end of the rake-teeth can be regulated at will by means of operating-lever $b$, which latter serves also for elevating the rake-teeth above the ground when required.

My arrangement of independent weights and independently-moving teeth insures an equal pressure upon each tooth, whether moving over even or unevenly surfaced ground.

What I claim as my invention, and desire to secure by Letters Patent, is—

1. Providing each of the rake-teeth $h\ e$ with an adjustable weight, $k$, substantially as and for the purposes set forth.

2. Combining two bearers, $d\ o$, with a lever, $b$, and ratchet-bar $c$, for the purpose of operating the rake-teeth $h\ e$, substantially as set forth.

3. Making the weights $k$ adjustable by hinging them to one of the bearers, $d$, substantially as and for the purposes set forth.

4. So arranging and combining the bearers $d\ o$, rake-teeth $h\ e$, and weights $k$ that one lever answers for regulating the weight upon each rake-tooth and for elevating the rake-teeth above the ground, as set forth.

A. R. HURST.

Witnesses:
D. A. WERTZ,
M. W. HOUSER.